US012602771B2

(12) United States Patent
Sheelavant et al.

(10) Patent No.: US 12,602,771 B2
(45) Date of Patent: Apr. 14, 2026

(54) IN SITU WAFER SEAL CHUCK DEFECTS IDENTIFICATION

(71) Applicant: Applied Materials, Inc., Santa Clara, CA (US)

(72) Inventors: Gangadhar Sheelavant, Guledgudd (IN); Karthick Vasu, Arakkonam (IN); Prabhugouda Shekharagouda Hiregoudra, Hosahalli (IN); Randy A Harris, Kalispell, MT (US); Aaron Juntunen, Kalispell, MT (US)

(73) Assignee: Applied Materials, Inc.

( * ) Notice: Subject to any disclaimer, the term of this patent is extended or adjusted under 35 U.S.C. 154(b) by 31 days.

(21) Appl. No.: 18/647,598

(22) Filed: Apr. 26, 2024

(65) Prior Publication Data

US 2025/0336056 A1 Oct. 30, 2025

(51) Int. Cl.
 *G06T 7/00* (2017.01)
 *G01M 3/38* (2006.01)
 *G08B 21/18* (2006.01)
 *H04N 23/11* (2023.01)

(52) U.S. Cl.
 CPC .............. *G06T 7/001* (2013.01); *G01M 3/38* (2013.01); *H04N 23/11* (2023.01); *G06T 2207/10048* (2013.01); *G06T 2207/20081* (2013.01); *G06T 2207/30148* (2013.01); *G08B 21/18* (2013.01)

(58) Field of Classification Search
 None
 See application file for complete search history.

(56) References Cited

U.S. PATENT DOCUMENTS

| | | | |
|---|---|---|---|
| 6,563,586 B1 * | 5/2003 | Stanke | B24B 49/12 257/E21.53 |
| 2006/0157698 A1 * | 7/2006 | Miyajima | H01L 21/67288 257/48 |
| 2007/0080057 A1 | 4/2007 | Mizohata et al. | |
| 2008/0080845 A1 | 4/2008 | Chen et al. | |
| 2008/0250570 A1 * | 10/2008 | Dayton | B25F 3/00 173/217 |
| 2009/0116727 A1 * | 5/2009 | Jin | G01N 21/9503 382/149 |
| 2013/0147506 A1 * | 6/2013 | Yamada | G01R 1/0491 324/756.03 |

(Continued)

FOREIGN PATENT DOCUMENTS

| | | |
|---|---|---|
| KR | 20220083303 A | 6/2022 |
| KR | 20240028049 A | 3/2024 |

OTHER PUBLICATIONS

International Application No. PCT/US2025/026143, International Search Report and Written Opinion mailed on Aug. 13, 2025, 11 page.

*Primary Examiner* — Stefan Gadomski
(74) *Attorney, Agent, or Firm* — Kilpatrick Townsend & Stockton LLP

(57) ABSTRACT

Exemplary wafer seal chuck assembly maintenance chambers may include a chamber body defining an open interior. The chambers may include a plurality of chuck assembly supports disposed within the open interior. The plurality of chuck assembly supports may be rotatable within the open interior. The chambers may include a tool arm that is positionable above the open interior. The chambers may include an imaging device mounted on a distal end of the tool arm.

19 Claims, 6 Drawing Sheets

(56)          References Cited

U.S. PATENT DOCUMENTS

| | | | |
|---|---|---|---|
| 2015/0168449 A1* | 6/2015 | Yamada | G01R 31/26 |
| | | | 324/755.04 |
| 2016/0225656 A1* | 8/2016 | Rye | H01L 21/68721 |
| 2018/0053319 A1* | 2/2018 | Kakuma | H01L 21/67259 |
| 2019/0259172 A1* | 8/2019 | Kakuma | G06T 7/254 |
| 2020/0255968 A1* | 8/2020 | Mukaiyama | G01N 21/94 |
| 2020/0393242 A1 | 12/2020 | Vishwanath et al. | |
| 2021/0074575 A1* | 3/2021 | Yamamoto | H01L 21/67115 |
| 2021/0150697 A1* | 5/2021 | Estrella | G06T 7/70 |
| 2021/0273167 A1* | 9/2021 | Liu | C23C 14/568 |
| 2022/0126454 A1* | 4/2022 | Martin | B25J 11/0095 |
| 2022/0310415 A1* | 9/2022 | Kwon | B08B 13/00 |
| 2023/0251080 A1* | 8/2023 | Lee | G01B 11/24 |
| | | | 356/601 |
| 2024/0128064 A1* | 4/2024 | Endo | H01L 21/677 |

* cited by examiner

400

IN SITU WAFER SEAL CHUCK DEFECTS IDENTIFICATION

TECHNICAL FIELD

The present technology relates to the production of three-dimensional objects having improved surface characteristics. The present technology relates to objects useful in electroplating systems, such as system seals that may be used to support a substrate during electroplating operations.

BACKGROUND

During the manufacture of semiconductor devices, a wafer may be submerged within a plating bath followed by metal formation on the wafer. The wafer may be held in place on an apparatus that submerges the wafer in a plating bath of electrolyte. The apparatus holding the wafer may include electrically conductive components contacting the wafer, allowing the wafer to operate as a cathode in the plating operation. Because the apparatus and electrical contacts may similarly be submerged within the plating bath, the apparatus may include a seal or multiple components operating as a seal to limit or prevent the electrolyte from contacting internal conductive components and potentially causing material to plate in undesired areas of the wafer. Additionally, such sealing may prevent the process chemistry from reaching internal components of a processing device that are behind the seal. These seal materials may include complex machined parts and specialized materials that may be relatively expensive. Over time, deposits from the plating chemistry may build up on the seal, which may degrade the seal or contaminate subsequently processed wafers. Other forms of damage may occur to the seal and/or nearby components of the plating assembly.

Thus, there is a need for improved systems and methods that can be used to effectively inspect seals and/or other components of a plating assembly for damage or residue contamination. These and other needs are addressed by the present technology.

SUMMARY

Exemplary wafer seal chuck assembly maintenance chambers may include a chamber body defining an open interior. The chambers may include a plurality of chuck assembly supports disposed within the open interior. The plurality of chuck assembly supports may be rotatable within the open interior. The chambers may include a tool arm that is positionable above the open interior. The chambers may include an imaging device mounted on a distal end of the tool arm.

In some embodiments, the imaging device may include a visible light camera. The imaging device may include one both of an infrared camera and an ultraviolet camera. The tool arm may be movable between a first position in which an entirety of the tool arm and the imaging device are located radially outward of the open interior and a second position in which the imaging device and the distal end of the tool arm are positioned directly above the open interior. The imaging device may include a field of view of at least 10 degrees. An orientation of the imaging device may be adjustable relative to the distal end of the tool arm. The chambers may include a seal rinse assembly that is positionable over the open interior. The seal rinse assembly may be coupled with the distal end of the tool arm. The plurality of chuck supports may be configured to receive and support a wafer seal chuck assembly. A lens of the imaging device may be directed radially outward from a central axis of the open interior.

Some embodiments of the present technology may encompass wafer seal chuck assembly maintenance chambers that may include a chamber body defining an open interior. The chambers may include a plurality of chuck assembly supports disposed within the open interior. The plurality of chuck assembly supports may be rotatable within the open interior. The chambers may include an imaging device that is positionable above the open interior. The chambers may include a seal rinse assembly that is positionable over the open interior.

In some embodiments, the chambers may include a tool arm that is movable between a first position in which an entirety of the tool arm is located radially outward of the open interior and a second position in which the distal end of the tool arm is positioned directly above the open interior, wherein the imaging device and the seal rinse assembly are coupled with the distal end of the tool arm. The chambers may include a first tool arm that is positionable over the open interior. The chambers may include a second tool arm that is positionable over the open interior. The imaging device may be coupled with a distal end of the first tool arm. The seal rinse assembly may be coupled with a distal end of the second tool arm. The first tool arm and the second tool arm may be positionable independently of one another. The chambers may include one or more processors. The chambers may include a memory having instructions stored thereon that, when executed by the one or more processors, cause the one or more processors to receive an image of a wafer seal chuck assembly from the imaging device, perform one or more digital image processing operations on the image, and identify at least one defect associated with the wafer seal chuck assembly based on the one or more digital image processing operations.

Some embodiments of the present technology may encompass methods of inspecting a wafer seal chuck assembly. The methods may include capturing an image of a wafer seal chuck assembly using an imaging device positioned above an open interior of a maintenance chamber. The methods may include performing one or more digital image processing operations on the image. The methods may include identifying at least one defect associated with the wafer seal chuck assembly based on the one or more digital image processing operations.

In some embodiments, the at least one defect may include at least one of seal lip metal plate up, seal elastomer damage, seal retainer metal plate up, backing plate burnout, a missing clip from a backing plate, metal plate up on an electrical contact, a missing contact from an electrical contact, or a misaligned contact from an electrical contact. Performing one or more digital image processing operations on the image may include comparing the image to a baseline image of a new wafer seal chuck assembly and identifying any differences between the image and the baseline image. Performing one or more digital image processing operations on the image may include providing the image to a machine learning model that has been trained to identify defects of wafer seal chuck assemblies based on images of defective wafer seal chuck assemblies. Identifying the at least one defect associated with the wafer seal chuck assembly may be performed by the machine learning model. The methods may include generating an alert for an operator upon identifying the at least one defect associated with the wafer seal chuck assembly. The methods may include rinsing the wafer seal chuck assembly after identifying the at least one defect associated with the wafer seal chuck assembly.

Such technology may provide numerous benefits over conventional systems and techniques. For example, embodiments of the present technology may enable automated detection and identification of one or more defects present on one or more components of a wafer seal chuck assembly. This may enable a more efficient and accurate determination of whether the wafer seal chuck assembly needs to be cleaned, serviced, and/or replaced. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Figure 1:
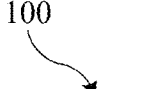
FIG. 1 shows a partial isometric view of an exemplary maintenance chamber according to some embodiments of the present technology.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

In many semiconductor processing applications it may be desirable to prevent process chemistry from coming into contact with a peripheral edge of a wafer and/or support components beneath the wafer. For example, the peripheral edge may include features such as electrical contacts that should not be covered with film, etched, plated, and/or otherwise processed. To protect such features, the wafer may be positioned within a seal of a wafer seal chuck assembly that may contact an upper surface of the wafer and create an airtight and/or liquid tight seal that prevents process chemistry from contacting the peripheral edge of the wafer or from otherwise passing beyond the seal. This may be done in various processing operations, including deposition, etch, and/or plating operations. As just one example, a wafer seal chuck assembly of an electrochemical plating apparatus may include a seal that prevents the peripheral edge of the wafer from coming into contact with a liquid electrolyte and thereby prevents any material from being plated atop the peripheral edge of the wafer. While such seals are effective at preventing unwanted effects on the peripheral edge of the wafer, over time the process chemistry may form residues or other deposits on a surface of the seal itself, or of another surface of the wafer seal chuck assembly. Such residue may degrade the material of the seal and shorten the seal's lifespan and/or may contaminate subsequently processed wafers. Additionally, over time, damage, such as bent, lost, or otherwise damaged electrical contacts, seal, and/or other components of the wafer seal chuck assembly may occur.

Conventional technology may monitor the health and/or cleanliness of a wafer seal chuck assembly through the use of laser inspection. However, due to the focused nature of lasers, such inspection techniques are slow and may require the use of a complex articulating holder and/or use of multiple lasers to inspect multiple components and areas of a wafer seal chuck assembly. This results in a reduction to throughput, additional design complexity, and additional expense associated with the need for multiple laser tools.

The present technology overcomes these and other problems by utilizing imaging devices, such as cameras, to image one or more surfaces and/or components of the wafer seal chuck assembly. Images from the imaging devices may be processed to detect and identify defects in the wafer seal chuck assembly. Such imaging devices may be mounted on a new or existing tool arm of a maintenance chamber (such as a rinsing chamber) and may include wider fields of view than laser systems. This may enable a single imaging device to monitor multiple components of the wafer seal chuck assembly without the need to make any/many adjustments to an orientation of the imaging device. This may also enable new components of the wafer seal chuck assembly to be monitored that are not possible to be monitored using existing laser-based systems. Additionally, the incorporation of the imaging devices into existing maintenance chambers may enable the inspection and cleaning of the wafer seal chuck assembly to be done at a single chamber, thus eliminating the need for an additional transfer step. Thus, embodiments of the present technology may provide improved and more efficient detection and identification of defects in wafer seal chuck assemblies that may increase throughput of the processing equipment.

Although the remaining disclosure will routinely identify specific optical inspection processes utilizing the disclosed technology, it will be readily understood that the systems and methods are equally applicable to other inspection systems, as well as processes as may occur in the described systems. Accordingly, the technology should not be considered to be so limited as for use with these specific plating processes or systems alone. The disclosure will discuss one possible system that may include electroplating components according to embodiments of the present technology before additional variations and adjustments to this system according to embodiments of the present technology are described.

FIG. 1 illustrates an exemplary wafer seal chuck maintenance chamber 100 that may be used to inspect and/or clean components of a wafer seal chuck assembly, such as wafer seal chuck assembly 180. Maintenance chamber 100 may include at least one chuck assembly support 105 that is configured to receive wafer seal chuck assembly 180. For example, each support 105 may be positioned against an underside and/or lateral surface of wafer seal chuck assembly 180 to elevate wafer seal chuck assembly 180 relative to a rinse basin 110, which may be an open interior defined by walls of a chamber body. Rinse basin 110 may be disposed below and extend radially beyond wafer seal chuck assembly 180 and may collect excess cleaning fluid during seal cleaning operations. Each support 105 may be disposed within rinse basin 110 and may extend above a top surface of rinse basin 110 in some embodiments. Supports 105 may be mounted on a rotating plate 115 that is disposed within rinse basin 110. Rotating plate 115 may be disposed above a bottom surface of rinse basin 110 and may be rotatable relative to rinse basin 110. For example, rotating plate 115 may be coupled with a motor (not shown) and/or other actuator that may cause rotating plate 115 to rotate relative to rinse basin 110. When wafer seal chuck assembly 180 is seated atop supports 105, rotation of supports 105 causes wafer seal chuck assembly 180 to rotate relative to rinse basin 110.

Maintenance chamber 100 may include a hub 125 that may be vertically translatable relative to a base of rinse basin 110. For example, hub 125 may be elevated above a top of rinse basin 110 to receive wafer seal chuck assembly 180 may be lowered to lower the wafer seal chuck assembly 180 onto supports 105 and/or to separate a lower portion of wafer seal chuck assembly 180 (e.g., a baseplate shown in dashed lines to enable a bottom of maintenance chamber to be illustrated) from an upper portion of wafer seal chuck assembly 180 (e.g., a seal 175 and/or seal retainer shown in solid lines). Maintenance chamber 100 may include one or more wafer supports 130 that may be arranged radially about hub 125 in some embodiments. Wafer supports 130 may be radially inward of supports 105 in some embodiments. Wafer supports 130 may be shorter than supports 105 in some embodiments, which may enable a wafer secured within wafer seal chuck assembly 180 to be supported atop wafer supports 130 upon separation of the upper and lower portions of wafer seal chuck assembly 180 and may enable the wafer to be removed from wafer seal chuck assembly 180 and maintenance chamber 100. In some embodiments, wafer supports 130 may be coupled with rotating plate 115, although other configurations are possible.

Maintenance chamber 100 may include one or more tool arms 135 that are each positionable above rinse basin 110 and/or within an interior of wafer seal chuck assembly 180. For example, tool arm 135 may translate, pivot, telescope, or otherwise move between a position in which all of tool arm 135 is disposed radially outward of wafer seal chuck assembly 180 and/or the open interior of rinse basin 110 and a position in which at least a distal end 140 of tool arm 135 is disposed within or above the interior of wafer seal chuck assembly 180, such as at a position directly above the open interior of rinse basin 110 that is radially inward of supports 105. Each tool arm 135 may include one or more tools disposed at distal end 140. For example, one or more imaging devices 145 may be coupled with distal end 140 of tool arm 135. Although shown with a single imaging device 145, it will be appreciated that maintenance chamber 100 may include one or more imaging devices, two or more imaging devices, three or more imaging devices, four or more imaging devices, or more. Each imaging device 145 may be coupled with a same tool arm, or one or more of the imaging devices may be coupled with different tool arms.

Imaging device 145 may be a camera, such as a visible light camera in some embodiments. In other embodiments, imaging device 145 may include an infrared camera and/or an ultraviolet camera or may take other forms. Imaging device 145 may have a field of view of at least 10 degrees, at least 20 degrees, at least 30 degrees, at least 45 degrees, at least 60 degrees, at least 90 degrees, at least 120 degrees, at least 180 degrees, or more. By having a field of view of at least 10 degrees, imaging device 145 may enable identification of defects across a broader range of wafer seal chuck assembly 180, including across multiple components of wafer seal chuck assembly 180, without the need to change the orientation of imaging device 145. This may provide advantages over conventional laser-based defect detection systems that require a narrowly focused laser to be directed at a defect. Imaging device 145 may capture still images and/or video images in color and/or monochrome. A resolution of imaging device 145 may be at least 1 megapixel, at least 2 megapixels, at least 3 megapixels, at least 4 megapixels, at least 5 megapixels, at least 10 megapixels, at least 15 megapixels, or more. Lateral dimensions of imaging device 145 may be sufficiently small such that imaging device 145 may fit within an open interior of wafer seal chuck assembly 180. For example, in some embodiments, lateral dimensions of imaging device 145 may be no greater than 250 mm, no greater than 225 mm, no greater than 200 mm, no greater than 175 mm, no greater than 150 mm, no greater than 125 mm, no greater than 100 mm, or less. In a particular embodiment, a length of imaging device may be no greater than 150 mm, no greater than 125 mm, no greater than 100 mm, no greater than 90 mm, no greater than 80 mm, or less, while a width of imaging device 145 may be no greater than 100 mm, no greater than 80 mm, no greater than 60 mm, no greater than 50 mm, no greater than 40 mm, no greater than 35 mm, or less.

Imaging device 145 may be oriented such that a lens of imaging device 145 is directed radially outward from a central axis of the open interior of rinse basin 110 when tool arm 135 is disposed over rinse basin 110. For example, when tool arm 135 is in a first position, an entirety of tool arm 135 and imaging device 145 are located radially outward of the open interior of rinse basin 110, while when tool arm 135 is in a second position imaging device 145 and distal end 140 of tool arm 135 are positioned directly above the open interior of rinse basin 110. In the second position, imaging device 145 may be oriented to capture images of one or more components of wafer seal chuck assembly 180. In some embodiments, a central axis of the lens of imaging device 145 may be oriented substantially horizontally, such as within 20 degrees of horizontal, within 15 degrees of horizontal, within 10 degrees of horizontal, within 5 degrees of horizontal, within 3 degrees of horizontal, within 1 degree of horizontal, or less. In some embodiments, the central axis of the lens of imaging device 145 may be oriented substantially vertically, such as within 20 degrees of vertical, within 15 degrees of vertical, within 10 degrees of vertical, within 5 degrees of vertical, within 3 degrees of vertical, within 1 degree of vertical, or less. In some embodiments, the central axis of the lens of imaging device 145 may be angled relative to vertical and horizontal, such as between 20 degrees and 70 degrees relative to horizontal, between 30 degrees and 60 degrees relative to horizontal, or between about degrees and 50 degrees relative to horizontal. A desired angle may be determined based on a subset of components of wafer seal chuck assembly 180 that are to be imaged. Additionally, in some embodiments, rather than being in an open center of wafer seal chuck assembly 180, imaging device 145 may be positioned above a portion of wafer seal chuck assembly 180, such as above a seal and/or seal retainer of wafer seal chuck assembly 180. Such positioning may, for example, enable imaging device 145 to capture images of the relative positioning of the seal and/or seal retainer, which may be used to determine if the seal has deviated from a desired location. Tool arm 135 may be maneuvered to different positions relative to wafer seal chuck assembly 180 to capture images of different regions of wafer seal chuck assembly 180.

The orientation of imaging device 145 relative to distal end 140 of tool arm 135 may be fixed in some embodiments. In other embodiments, the orientation of imaging device 145 relative to distal end 140 of tool arm 135 may be adjustable along one or more axes of rotation such that imaging device 145 may be tilted up, down, or side to side relative to distal end 140 of tool arm 135. For example, imaging device 145 may be coupled with distal end 140 using a ball joint, pinned connection, hinge, and/or other rotatable connection. Adjustment of the orientation of imaging device 145 may be done manually and/or controlled using one or more actuators.

Maintenance chamber 100 may include and/or otherwise be coupled with a computing device 190. Computing device 190 may include one or more processors and at least one memory that stores instructions thereon. The instructions may be executed by the one or more processors to control operation of computing device 190, such as to control functionality of imaging device 145 and/or to detect one or more defects associated with wafer seal chuck assembly 180. For example, computing device 190 may cause imaging device 145 to capture one or more images (still and/or video) of one or more areas and/or components of wafer seal chuck assembly 180. In other embodiments, imaging device 145 may include dedicated processors that control operation of imaging device 145. Computing device 190 may receive the images from imaging device 145 and may perform one or more digital image processing operations on the image to identify at least one defect associated with the wafer seal chuck assembly 180. For example, image processing operations may involve comparing any images of wafer seal chuck assembly 180 with a baseline image or set of images. The baseline images may depict wafer seal chuck assembly 180 (or another similar wafer seal chuck assembly) in a new, pristine condition. Computing device 190 may identify any differences between the images of wafer seal chuck assembly 180 and identify the differences as potential defects. In some embodiments, computing device 190 may not only identify differences, but may also be able to determine a type of defect associated with a given difference in the images. For example, computing device 190 may include an object detection module that may compare objects depicted in the captured images of wafer seal chuck assembly 180 and determine whether each object is a specific component of wafer seal chuck assembly 180, whether the component is in a clean or dirty state, whether the component is damaged, whether there is any residue present, and/or other defects. In some embodiments, defects that are identifiable by computing device 190 may include, without limitation, seal lip metal plate up, seal elastomer damage, seal retainer metal plate up, backing plate burnout, a missing clip from a backing plate, metal plate up on an electrical contact, a missing contact from an electrical contact, and/or a misaligned contact from an electrical contact.

In some embodiments, computing device 190 may include a machine learning module and/or other artificial intelligence module. For example, the artificial intelligence module may include a convolutional neural network, a deep learning neural network, a recurrent neural network, and/or other suitable variations of neural networks. Alternatively, the artificial intelligence model includes other suitable types of models such as support vector machines, and the like. In other alternative examples, the artificial intelligence model may include other suitable types of artificial intelligence algorithms for identifying defects in a wafer seal chuck assembly. The artificial intelligence module may be trained, for example, using images of wafer seal chuck assemblies and components thereof, some of which are in a new state and others in which one or more components of the wafer seal chuck assemblies are damaged, dirty, and/or otherwise unsuitable for use in plating operations. Based on the training data, the artificial intelligence module may identify defects of wafer seal chuck assemblies based on images of defective wafer seal chuck assemblies. Thus, the captured image(s) of wafer seal chuck assembly 180 may be provided as inputs to the artificial intelligence module and the module may output a determination of whether wafer seal chuck assembly 180 includes any defects. If one or more defects are identified, the artificial intelligence module may output descriptions and/or other indications of one or more specific defects that are present.

In some embodiments, if one or more defects are identified, computing device 190 may generate an alert to one or more operators of maintenance chamber 100. For example, computing device 190 may generate one or more audio and/or visual alerts using an output device (e.g., a light, speaker, user interface/display, etc.) of computing device 190 that may alert the operators that one or more defects have been identified and/or what form the defects have taken. The alerts may enable the operators to determine whether wafer seal chuck assembly 180 is suitable for use in future plating operations, or if cleaning, servicing, replacement, or other actions need to be taken.

In some embodiments, computing device 190 may control an orientation and/or position of tool arm 135 and/or imaging device 145. For example, an orientation (e.g., left/right and/or up/down) of a lens of imaging device 145 may be adjusted based on commands from computing device 190. The commands may be automated commands, such as based on a control algorithm, and/or may be based on automated control, such as based on computing device 190 detecting a potential defect and adjusting the position of imaging device 190 to capture a better view of the potential defect. In some embodiments, in addition or alternatively to automated control, an operator may provide manual inputs to adjust an orientation of imaging device 145.

Maintenance chamber 100 may include a seal rinse assembly 150 that is positionable over the open interior of rinse basin 110 in some embodiments. Rinse assembly 150 may be configured to rinse, clean, and/or dry one or more components of wafer seal chuck assembly 180. For example, rinse assembly 150 may clean and/or dry a seal and/or seal retainer of wafer seal chuck assembly 180 before and/or after any defects on wafer seal chuck assembly 180 have been identified. Rinse assembly 150 may be coupled with tool arm 135. For example, rinse assembly 150 may be coupled with distal end 140 of tool arm 135, such as proximate imaging device 145. In some embodiments, imaging device 145 and rinse assembly 150 may be coupled with one another, while in other embodiments imaging device 145 and rinse assembly 150 may be on opposite sides of distal end 140. In some embodiments, rinse assembly 150 may be on a different tool arm than imaging device 145. For example, the imaging device is coupled with a distal end of a first tool arm and the seal rinse assembly is coupled with a distal end of a second tool arm. The first tool arm and the second tool arm may be positionable independently of one another and may be laterally spaced apart from one another in some embodiments. Each tool arm may be translatable between a first position in which an entirety of the tool arm is located radially outward of the open interior and a second position in which the distal end of the tool arm is positioned directly above the open interior.

In some embodiments, rinse assembly 150 may include one or more components that may deliver and cleaning and/or rinsing fluid to a portion of wafer seal chuck assembly 180 and/or to a cleaning pad or other contact member that may contact and wipe a surface of one or more components of wafer seal chuck assembly 180. For example, rinse assembly 150 may include one or more nozzles or fluid ports that may direct a cleaning and/or rinsing fluid to a surface of wafer seal chuck assembly 180, such as to a surface of a seal and/or seal retainer of wafer seal chuck assembly 180. Rinse assembly 150 may include a pad holder that may be configured to releasably secure a cleaning pad that may be positioned against an inner edge of the seal to wipe deposits from a surface of the seal and/or the seal retainer. In some embodiments, the pad holder may be rotatably coupled with tool arm 135. For example, distal end 140 of tool arm 135 may include an actuator that may maneuver between a retracted position and a cleaning position. The actuator may be configured to rotate between the two positions. In the retracted position, the pad holder may be positioned at a height that is above the seal (and top ends of supports 105) when wafer seal chuck assembly 180 is seated atop supports 105. This may provide clearance for tool arm 135 to move between a position that is outside rinse basin 110 (e.g., to enable wafer seal chuck assembly 180 to be transferred to and from supports 105) and a position in which distal end 140 of tool arm 135 is disposed within the interior of wafer seal chuck assembly 180. In the cleaning position, the pad holder may be positioned such that a cleaning pad supported by the pad holder is disposed in vertical alignment with the inner edge of the seal, which may enable the cleaning pad to be moved into engagement with the inner edge of the seal. For example, tool arm 135 may be configured to move horizontally, such as by pivoting or rotating about an axis, which may enable tool arm 135 to laterally move a cleaning pad secured against the pad holder into engagement with the inner edge of the seal 175 once the actuator has been moved to the cleaning position.

Rinse assembly 150 may include a cleaning fluid source that may deliver a cleaning fluid to the cleaning pad and/or the seal. For example, the pad holder may define a fluid lumen that is fluidly coupled with a fluid fitting or other port. One or more cleaning fluid lines may be fluidly coupled with the pad holder via the fluid fitting. The fluid lumen may route the cleaning fluid to a rear surface of the cleaning pad to saturate the cleaning pad for more effective cleaning of the seal and to better lubricate the interface between the cleaning pad and the seal. In some embodiments, additional fluid lines may be included to deliver a volume of the cleaning fluid directly to the surface of the seal, such as at angular locations before and/or after the cleaning pad. The cleaning fluid source may flow cleaning fluid at rates of between about 3 mL/min and 1000 mL/min, between 100 mL/min and 800 mL/min, or between 200 mL/min and 600 mL/min in some embodiments.

Figures 3A, 3B:
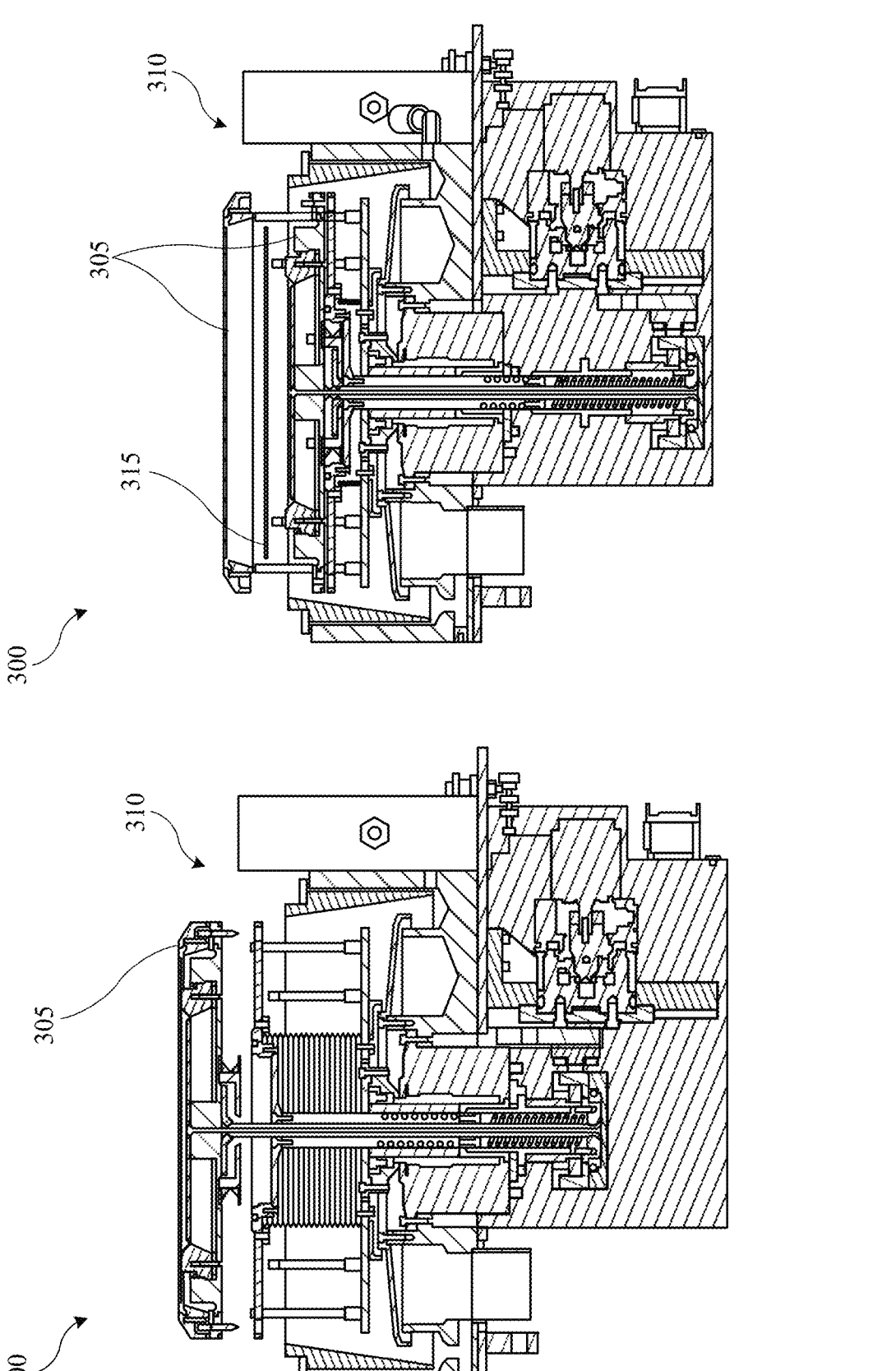
FIG. 3A shows a schematic cross-sectional side elevation view of an exemplary maintenance chamber receiving a wafer seal chuck assembly according to some embodiments of the present technology.
FIG. 3B shows a schematic cross-sectional side elevation view of the maintenance chamber of FIG. 3A with the wafer seal chuck assembly disassembled according to some embodiments of the present technology.
Figures 3C, 3D:
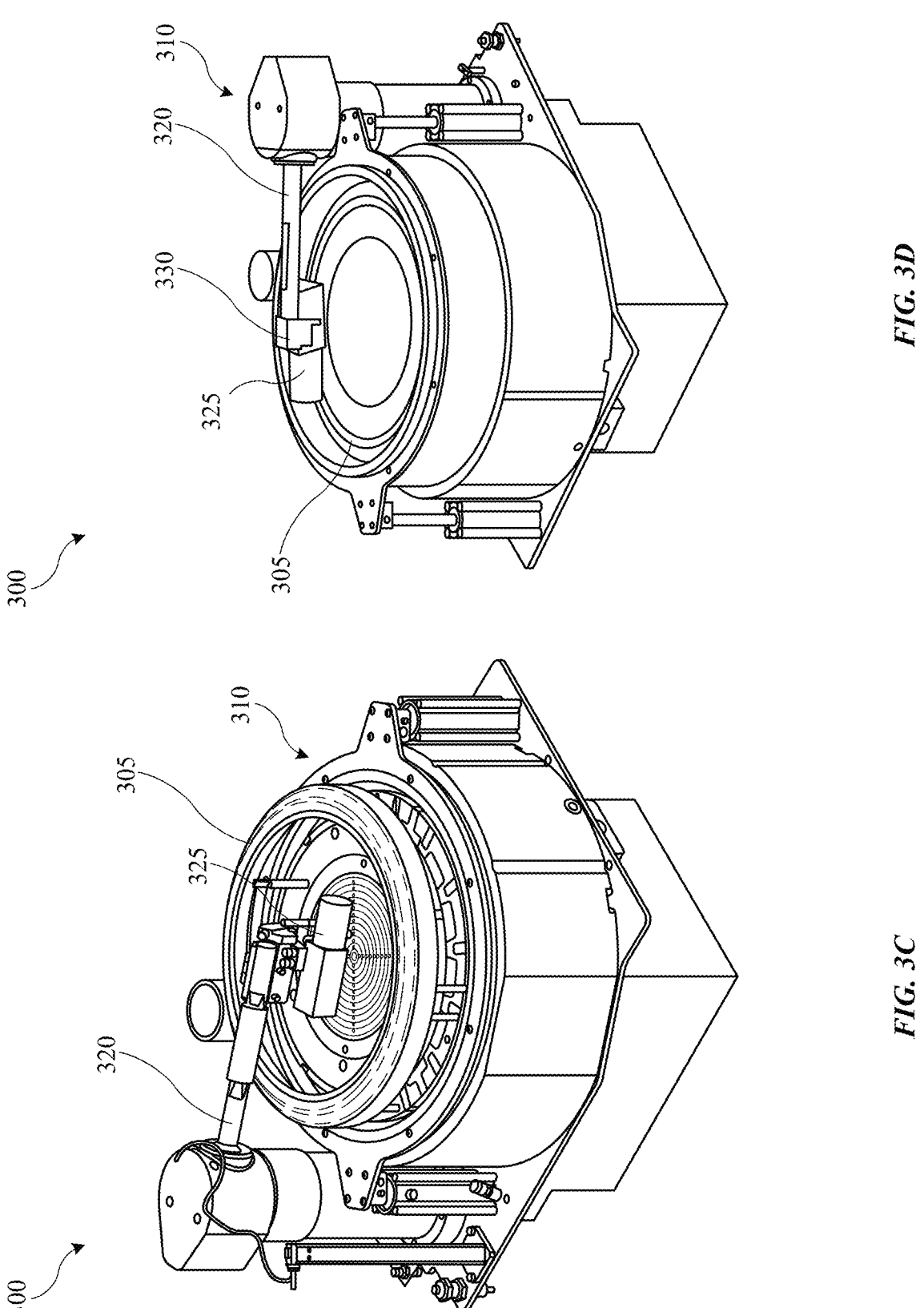
FIG. 3C shows a schematic cross-sectional side elevation view of the maintenance chamber of FIG. 3A with the wafer seal chuck assembly being imaged according to some embodiments of the present technology.
FIG. 3D shows a schematic cross-sectional side elevation view of the maintenance chamber of FIG. 3A with the wafer seal chuck assembly being cleaned according to some embodiments of the present technology.

Maintenance chamber 100 may include a rinse curtain 155 that may be vertically translated between a lower stowed position and a raised rinse position (a raised rinse curtain is best shown in FIG. 3D) using one or more actuators. Rinse curtain 155 may be lowered to the stowed position when wafer seal chuck assembly 180 is being loaded onto and/or unloaded from supports 105 and/or during imaging of wafer seal chuck assembly 180. Rinse curtain 155 may be raised to the rinsing position just prior to and during rinsing/cleaning operations. For example, prior to the cleaning fluid source delivering cleaning fluid to the pad holder and/or the seal, rinse curtain 155 may be raised up to a height that is above at least a portion of wafer seal chuck assembly 180. Rinse curtain 155 may have an inner diameter that is greater than an outer diameter of wafer seal chuck assembly 180 such that when raised, rinse curtain 155 surrounds wafer seal chuck assembly 180. This enables rinse curtain 155 to catch any cleaning fluid that may spray outward beyond wafer seal chuck assembly 180 and direct the cleaning fluid into the interior of rinse basin 110.

During cleaning operations, a cleaning pad may be secured to the pad holder of rinse assembly 150 and wafer seal chuck assembly 180 may be seated atop supports 105. Tool arm 135 may be maneuvered to a position in which at least distal end 140 of tool arm 135 is disposed within the interior of wafer seal chuck assembly 180. The actuator of rinse assembly 150 may be moved to the cleaning position in which the cleaning pad is disposed in vertical alignment with an inner edge of the seal of wafer seal chuck assembly 180. Tool arm 135 may then be maneuvered laterally to engage the cleaning pad with the inner edge of the seal. Before, during, and/or after engagement of the cleaning pad with the inner edge of the seal, a cleaning solution may be flowed from the cleaning fluid source to the fluid fitting of the pad holder for delivery to a rear surface of the cleaning pad. Before, during, and/or after engagement of the cleaning pad with the inner edge of the seal, a motor of maintenance chamber 100 may be actuated to rotate rotating plate 115 and supports 105, which may cause wafer seal chuck assembly 180 to rotate relative to the cleaning pad. The rotation of wafer seal chuck assembly 180 may enable the cleaning pad to wipe against and clean an entire circumference of the inner edge of the seal.

Figure 2A:
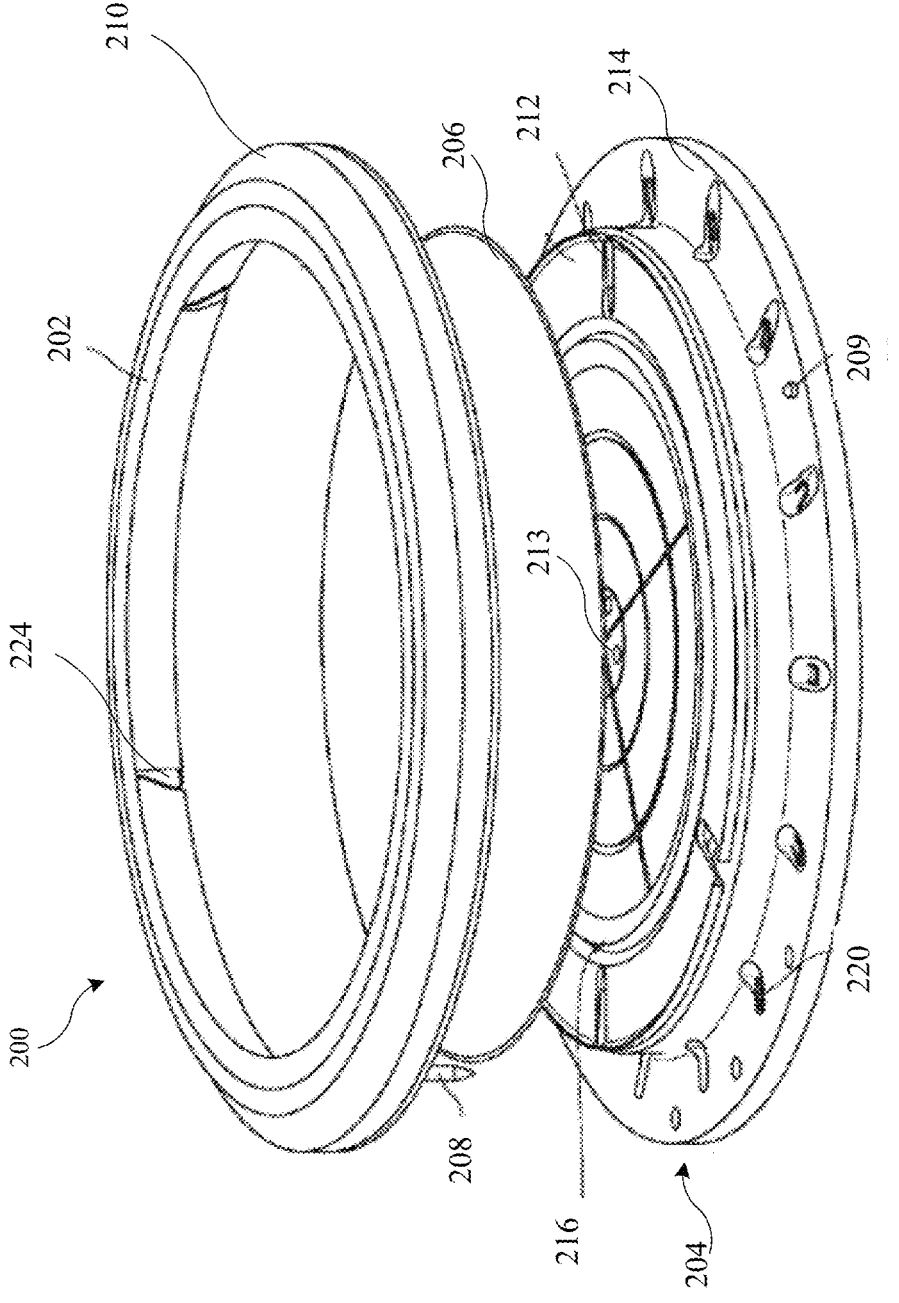
FIG. 2A shows a top perspective exploded view of a wafer seal chuck assembly according to embodiments of the present technology.
Figure 2B:
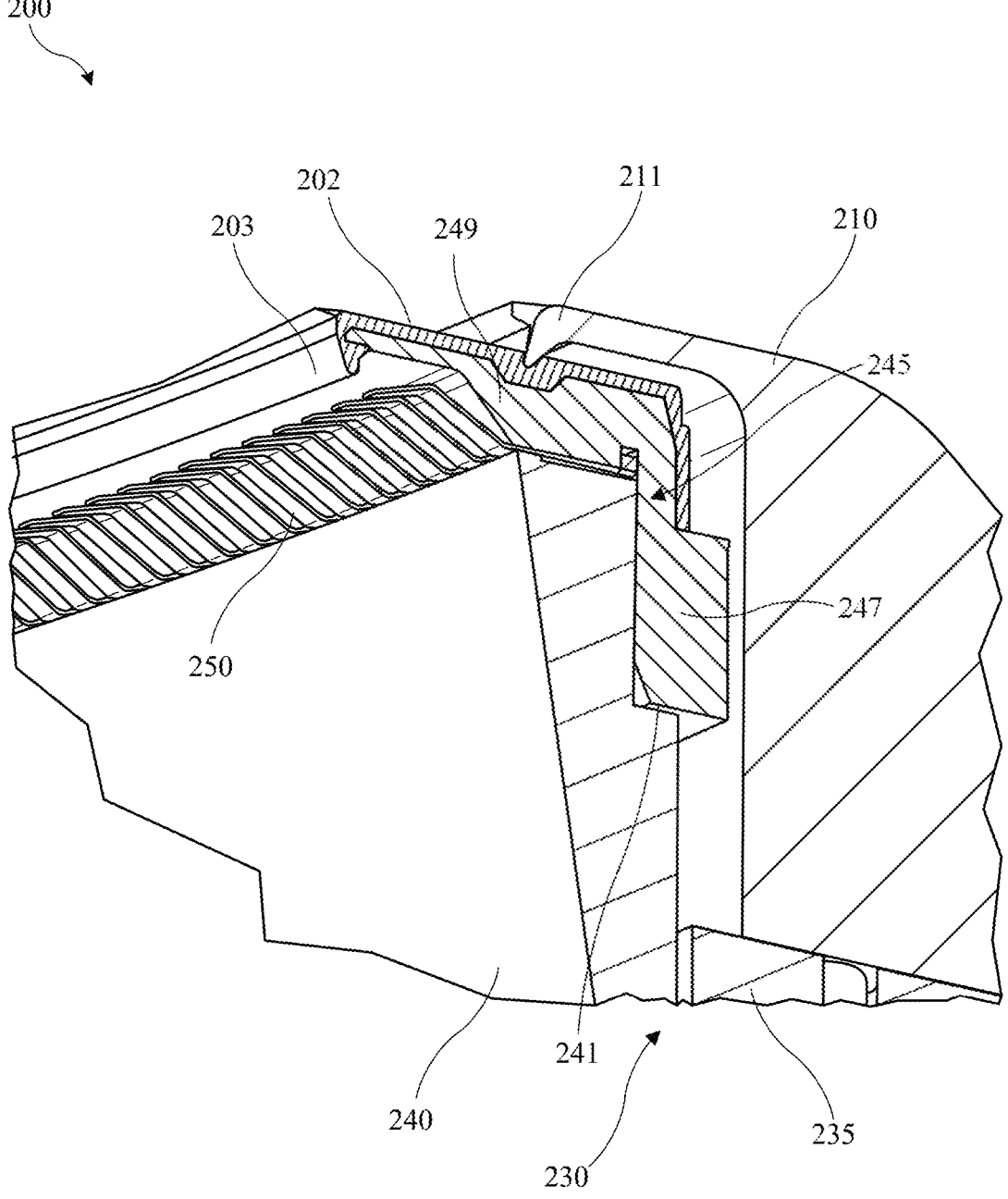
FIG. 2B shows a partial cross-sectional schematic view of the wafer seal chuck assembly of FIG. 2A.

FIGS. 2A and 2B illustrate one embodiment of a wafer seal chuck assembly 200. Wafer seal chuck assembly 200 may be used in a maintenance chamber, such as maintenance chamber 100. For example, wafer seal chuck assembly 200 may be used as wafer seal chuck assembly 180 and may include any of the features described in relation to wafer seal chuck assembly 180. As illustrated in FIG. 2A, the wafer seal chuck assembly 200 may include a seal 202 and a backing plate assembly 204, configured to releasably retain a substrate 206 therebetween for processing. Seal 202 may be secured to backing plate assembly 204 using a seal retainer 210, which may be formed from a different material than seal 202, such as from a non-plastic material. For example, seal retainer 210 may include one or more centering pins 208 that may be used to align and/or couple seal retainer 210 with backing plate assembly 204 to secure seal 202 therebetween. It should be clear that other configurations as known in the art may be utilized. Backing plate assembly 204 may include one or more chucking pins 220 and/or one or more sealing assembly location pins 209, and a substrate support surface 212. In embodiments, substrate support surface 212 may contain a seal 216 for contacting a backside surface (e.g. surface opposite the working surface that contacts the plating bath liquid) of substrate 206 and a base 214. The backside seal 216 between the substrate support surface 212 and the backside of substrate 206 may include vacuum pressure utilizing one or more vacuum ports 213.

FIG. 2B shows a partial cross-sectional schematic view of electroplating wafer seal chuck assembly 200 according to some embodiments of the present technology. Wafer seal chuck assembly 200 may include a support assembly 230 that may include a base 235 and an inner support member 240. Support assembly 230 may be designed to be seated atop backing plate assembly 204, such as atop base 214. Inner support member 240 may be formed as a separate component or integrally with base 235 and may extend upward beyond an upper surface of base 235. It will be appreciated that the directionality described in relation to FIG. 2B is described based on the orientation of the figure and is not meant to limit the orientation of the final device. For example, the inner support member 240 may be inverted relative to the figure during operation of the wafer seal chuck assembly 200. In some embodiments, an outer surface of the inner support member 240 may include or define a ledge 241 that may extend annularly about the inner support member 240. A busbar 245 may be seated atop ledge 241 and an upper surface of inner support member 240. For example, busbar 245 may be an annular component and may include one or more pieces connected together. Busbar 245 may include a lower portion 247 that is seated atop ledge 241 and an upper portion 249 that is seated atop and extends inward of inner support member 240. The lower portion 247 may be radially outward of the upper portion 249. An outer region of the upper portion 249 may be seated atop the inner support member 240, while an inner region of the upper portion 249 may taper upward beyond the upper surface of the inner support member 240 and may become horizontal near an inner diameter of the busbar 245. The busbar 245 may be an annular component that extends entirely about a circumference of wafer seal chuck assembly 200. As will be discussed in greater detail below, busbar 245 may be designed to support seal 202 and may form a portion of a path for delivering electrical current to the substrate 206.

A number of contact pins or other electrical contacts 250 may be disposed atop the inner support member 240 and may be positioned between a top surface of the inner support member 240 and a lower surface of busbar 245. For example, an outer portion of each electrical contact 250 may be generally planar and may be positioned between inner support member 240 and busbar 245. A medial portion of each electrical contact 250 may extend radially inward of an inner edge of the inner support member 240 and may bend upward above the top surface of the inner support member 240, while remaining vertically spaced apart from a bottom surface of the busbar 245. An inner portion of each electrical contact 250 may bend downward and may be positioned such that a distal end of the inner portion may contact a surface of the substrate 206 when the substrate 206 is positioned within the wafer seal chuck assembly 200. The bent structure of the medial and inner portions of the electrical contacts 250 may enable the electrical contacts 250 to flex away from the substrate 206 to prevent the electrical contacts 250 from damaging the substrate 206, while enabling the electrical contacts 250 to resiliently rebound to a neutral position (as illustrated) when no substrate 206 is present within the wafer seal chuck assembly 200. The electrical contacts 250 may be formed from an electrically conductive material such that current from the busbar 245 may be delivered to the substrate 206 via the electrical contacts 250.

Seal 202 may be seated atop busbar 245. In some embodiments, an outer portion of seal 202 may extend downward along an outer surface of busbar 245, while a medial portion of seal 202 may extend horizontally along an upper surface of busbar 245. An inner edge of seal 202 may curl around and cover an inner edge of busbar 245. In some embodiments, a bottom surface of the inner edge of seal 202 may form a seal lip 203 that may protrude downward and may be designed to contact a surface of the substrate 206. The inner edge and the seal lip of seal 202 may be radially inward of the busbar 245 and the inner end of each electrical contact 250. The seal retainer 210 may be seated against base 235, possibly with an outer lip of seal retainer 210 being positioned against a lateral surface of base 235 in some embodiments. Seal retainer 210 may include an inner portion 211 that may extend radially inward to a position that is aligned with the inner support member 240. The inner portion 211 may include a downward-protruding lip that may extend toward and may contact an upper surface of seal 202 to compress and retain seal 202 between seal retainer 210 and busbar 245.

FIGS. 3A-3D illustrate a general process flow for handling a wafer seal chuck assembly 305 using a maintenance chamber, such as maintenance chamber 310. The wafer seal chuck assembly 305 may be similar to wafer seal chuck assemblies 180 and 200 and may include any features described in relation to wafer seal chuck assemblies 180 and 200. The maintenance chamber 310 may be similar to maintenance chamber 100 and may include any features described in relation to maintenance chamber 100. In FIG. 3A, wafer seal chuck assembly 305 is delivered to maintenance chamber 310, such as after wafer seal chuck assembly 305 has been used in a plating operation. For example, wafer seal chuck assembly 305 may be positioned atop a hub, such as hub 125, of maintenance chamber 310 that is raised above a rinse basin (such as rinse basin 110) of the maintenance chamber 310. Wafer seal chuck assembly 305 may be separated at maintenance chamber 310 as shown in FIG. 3B. For example, a top portion of wafer seal chuck assembly 305 (which may include components described in relation to FIGS. 2A and 2B such as a seal retainer, seal, electrical contacts, support assembly, busbar, etc.) may be disengaged from a lower portion of wafer seal chuck assembly 305 (which may include components described in relation to FIG. 2A such as a backing assembly, etc.). For example, the hub of maintenance chamber 310 may be lowered until the lower portion of wafer seal chuck assembly 305 is disposed on or slightly above a bottom of the rinse basin. As the hub is lowered, a substrate 315 supported within the wafer seal chuck assembly may contact and be supported by wafer supports (such as wafer supports 130), while the upper portion of the wafer seal chuck assembly 305 may contact and be supported above the substrate 315 by supports (such as supports 105). An end effecter of maintenance chamber 310 or another device may be used to engage and remove substrate 315 from a position between the lower and upper portion of wafer seal chuck assembly 305.

Once substrate 315 has been removed, a tool arm 320, such as tool arm 135, may be moved into a position in which a distal end of the tool arm 320 (and one or more tools attached to tool arm 320) is disposed within or above the interior of wafer seal chuck assembly 305 as shown in FIG. 3C. Here, an imaging device 325 (such as imaging device 145) is coupled with the tool arm 320 and is oriented toward an inner edge of wafer seal chuck assembly 305. The imaging device 325 may image and inspect one or more components of wafer seal chuck assembly 305 such as, but not limited to, a seal, a seal retainer, electrical contacts, and/or the backing assembly and/or components thereof. For example, the imaging device 325 and/or wafer seal chuck assembly 305 may rotate (e.g., via movement of the tool arm 320 and/or a coupling between the imaging device 325 and the tool arm 320 and/or via rotation of a rotating plate) and/or otherwise change orientation (e.g., vertical and/or horizontal tilting of the imaging device 325) to enable the imaging device 325 to image 360 degrees (or less) of some or all components of wafer seal chuck assembly 305. Images taken from imaging device 325 may be processed and analyzed to detect whether any defects are present on wafer seal chuck assembly such as, but not limited to, metal plate up from the electroplating process on a lip of the seal, damage to an elastomeric material of the seal, metal plate up from the electroplating process on the seal retainer, burnout on the backing plate, a missing clip from the backing plate, metal plate up from the electroplating process on an electrical contact, whether an electrical contact is missing, and/or whether an electrical contact is misaligned.

If wafer seal chuck assembly 305 fails the inspection (e.g., has one or more major defects that cannot be rinsed off), the wafer seal chuck assembly 305 may be removed to a maintenance and/or refurbishment area to be repaired. If wafer seal chuck assembly 305 passes the inspection (e.g., has no major defects that cannot be rinsed off), the wafer seal chuck assembly 305 may continue to a rinse process. The rinse process may be performed in maintenance chamber 310 as illustrated in FIG. 3D or in another chamber. As illustrated, tool arm 320 also includes a rinse assembly 330 (which may be similar to rinse assembly 150) that may deliver a cleaning and/or rinsing solution to the seal and/or seal retainer of wafer seal chuck assembly 305. While shown with tool arm 320 including both imaging device 325 and rinse assembly 330, it will be appreciated that the tools may be provided on separate tool arms in some embodiments. During cleaning and rinsing, a rinse curtain (which may be similar to rinse curtain 155) may be raised about wafer seal chuck assembly 305 and one or more liquid solutions may be applied to the upper and/or lower portions of wafer seal chuck assembly 305 using rinse assembly 330. Wafer seal chuck assembly 305 may be rotated relative to the rinse assembly 330 to ensure that the inner edge of the seal and/or seal retainer are properly cleaned/rinsed. Wafer seal chuck assembly 305 may then be actively (e.g., by circulating air and/or exposure to a heat source) and/or passively dried, a new substrate may be inserted, the upper and lower portions reengaged, and then may be used in a subsequent plating operation.

Figure 4:
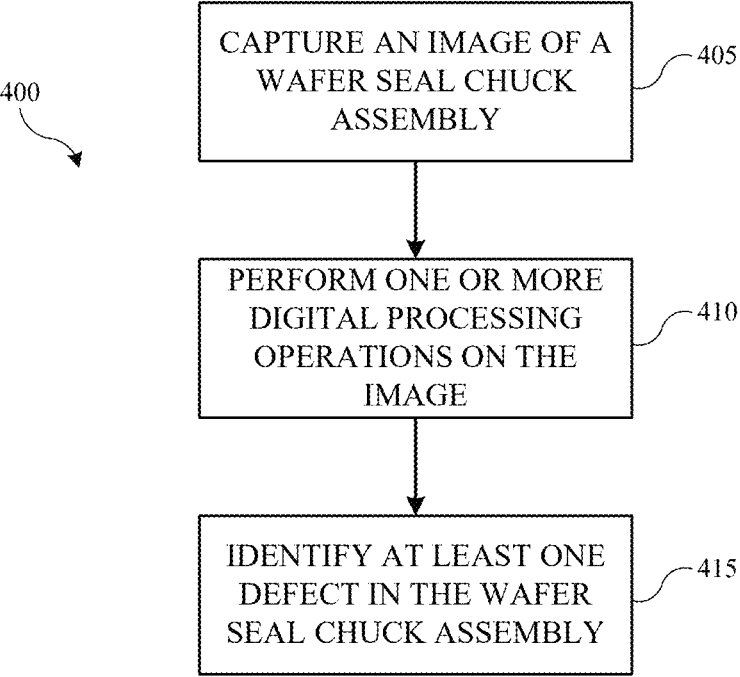
FIG. 4 shows operations of an exemplary method of inspecting a wafer seal chuck assembly according to some embodiments of the present technology.

FIG. 4 shows operations of an exemplary method 400 for inspecting a wafer seal chuck assembly according to some embodiments of the present technology. The method may be performed using a variety of cleaning apparatuses, including maintenance chambers 100 and 310 described above, which may include imaging devices according to embodiments of the present technology, such as imaging devices 145 and 325. Method 400 may include a number of optional operations, which may or may not be specifically associated with some embodiments of methods according to the present technology.

Method 400 may include optional operations prior to initiation of method 400, or the method may include additional operations. For example, method 400 may include operations performed in different orders than illustrated. In some embodiments, method 400 may include capturing one or more images of a wafer seal chuck assembly using an imaging device positioned above an open interior of a maintenance chamber at operation 405. The images may include still images and/or videos of one or more regions (possibly the entirety) of the wafer seal chuck assembly, such as wafer seal chuck assemblies 180, 200, and 305. The images captured by the imaging device may be sent to and received by a processor of the imaging device and/or maintenance chamber.

At operation 410, one or more digital image processing operations may be performed on the images. For example, image processing operations may involve comparing any images of the wafer seal chuck assembly with a baseline image or set of images. The baseline images may depict the wafer seal chuck assembly (or another similar wafer seal chuck assembly) in a new, pristine condition. In some embodiments, the digital image processing operations may involve providing the image to a machine learning model that has been trained to identify defects of wafer seal chuck assemblies based on images of defective wafer seal chuck assemblies.

At operation 415, at least one defect associated with the wafer seal chuck assembly may be identified based on the one or more digital image processing operations. For example, any differences between the images of the wafer seal chuck assembly and the baseline images and/or detected by the machine learning module may be identified as potential defects. In some embodiments, the differences may not just be identified, but may also be categorized as a particular type of defect associated with a given difference in the images. For example, an object detection module may compare objects depicted in the captured images of the wafer seal chuck assembly and determine whether each object is a specific component of the wafer seal chuck assembly, whether the component is in a clean or dirty state, whether the component is damaged, whether there is any residue present, and/or other defects. The identification of defects may be performed by the processor and/or machine learning module in various embodiments. For example, the captured image(s) of the wafer seal chuck assembly may be provided as inputs to the artificial intelligence module and the module may output a determination of whether the wafer seal chuck assembly includes any defects. In the instance where no defects are identified, the wafer seal chuck assembly may continue to a clean/rinse operation and/or may otherwise remain in service. If one or more defects are identified, the artificial intelligence module may output descriptions and/or other indications of one or more specific defects that are present. In some embodiments, defects that are identifiable may include, without limitation, seal lip metal plate up, seal elastomer damage, seal retainer metal plate up, backing plate burnout, a missing clip from a backing plate, metal plate up on an electrical contact, a missing contact from an electrical contact, and/or a misaligned contact from an electrical contact.

In some embodiments, when one or more defects are identified, an alert for an operator may be generated. The alert may be an audio and/or visual alert that may notify the operator that one or more defects have been identified. This may enable the operator to determine whether the wafer seal chuck assembly needs to be serviced or whether just a clean/rinse is needed. If servicing is required, the wafer seal chuck assembly may be removed from the maintenance chamber and sent to a service area. If only cleaning is required, the wafer seal chuck assembly may be cleaned, rinsed, and/or dried by a rinse assembly of maintenance chamber or another chamber.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a heater" includes a plurality of such heaters, and reference to "the protrusion" includes reference to one or more protrusions and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A wafer seal chuck assembly maintenance chamber, comprising:
   a chamber body defining an open interior;
   a plurality of chuck assembly supports disposed within the open interior, the plurality of chuck assembly supports being rotatable within the open interior;
   a tool arm that is positionable above the open interior; and
   an imaging device mounted on a distal end of the tool arm.

2. The wafer seal chuck assembly maintenance chamber of claim 1, wherein:
   the imaging device comprises a visible light camera.

3. The wafer seal chuck assembly maintenance chamber of claim 1, wherein:
   the imaging device comprises one both of an infrared camera and an ultraviolet camera.

4. The wafer seal chuck assembly maintenance chamber of claim 1, wherein:
   the tool arm is movable between a first position in which an entirety of the tool arm and the imaging device are located radially outward of the open interior and a second position in which the imaging device and the distal end of the tool arm are positioned directly above the open interior.

5. The wafer seal chuck assembly maintenance chamber of claim 1, wherein:
   the imaging device comprises a field of view of at least 10 degrees.

6. The wafer seal chuck assembly maintenance chamber of claim 1, wherein:
   an orientation of the imaging device is adjustable relative to the distal end of the tool arm.

7. The wafer seal chuck assembly maintenance chamber of claim 1, further comprising:
   a seal rinse assembly that is positionable over the open interior.

8. The wafer seal chuck assembly maintenance chamber of claim 7, wherein:
   the seal rinse assembly is coupled with the distal end of the tool arm.

9. The wafer seal chuck assembly maintenance chamber of claim 1, wherein:
   the plurality of chuck supports are configured to receive and support a wafer seal chuck assembly.

10. The wafer seal chuck assembly maintenance chamber of claim 1, wherein:
    a lens of the imaging device is directed radially outward from a central axis of the open interior.

11. A wafer seal chuck assembly maintenance chamber, comprising:
    a chamber body defining an open interior;
    a plurality of chuck assembly supports disposed within the open interior, the plurality of chuck assembly supports being rotatable within the open interior;
    an imaging device that is positionable above the open interior; and
    a seal rinse assembly that is positionable over the open interior.

12. The wafer seal chuck assembly of claim 11, further comprising:
    a tool arm that is movable between a first position in which an entirety of the tool arm is located radially outward of the open interior and a second position in which a distal end of the tool arm is positioned directly above the open interior, wherein the imaging device and the seal rinse assembly are coupled with the distal end of the tool arm.

13. The wafer seal chuck assembly of claim 11, further comprising:

a first tool arm that is positionable over the open interior; and a second tool arm that is positionable over the open interior, wherein:

the imaging device is coupled with a distal end of the first tool arm;

the seal rinse assembly is coupled with a distal end of the second tool arm; and the first tool arm and the second tool arm are positionable independently of one another.

14. The wafer seal chuck assembly of claim 11, further comprising:

one or more processors; and a memory having instructions stored thereon that, when executed by the one or more processors, cause the one or more processors to:

receive an image of a wafer seal chuck assembly from the imaging device;

perform one or more digital image processing operations on the image; and identify at least one defect associated with the wafer seal chuck assembly based on the one or more digital image processing operations.

15. A method of inspecting a wafer seal chuck assembly, comprising:

capturing an image of a wafer seal chuck assembly using an imaging device positioned above an open interior of a maintenance chamber;

performing one or more digital image processing operations on the image; and identifying at least one defect associated with the wafer seal chuck assembly based on the one or more digital image processing operations, wherein the at least one defect comprises at least one of seal lip metal plate up, seal elastomer damage, seal retainer metal plate up, backing plate burnout, a missing clip from a backing plate, metal plate up on an electrical contact, a missing contact from an electrical contact, or a misaligned contact from an electrical contact.

16. The method of inspecting a wafer seal chuck assembly of claim 15, wherein:

performing one or more digital image processing operations on the image comprises comparing the image to a baseline image of a new wafer seal chuck assembly and identifying any differences between the image and the baseline image.

17. The method of inspecting a wafer seal chuck assembly of claim 15, wherein:

performing one or more digital image processing operations on the image comprises providing the image to a machine learning model that has been trained to identify defects of wafer seal chuck assemblies based on images of defective wafer seal chuck assemblies; and identifying the at least one defect associated with the wafer seal chuck assembly is performed by the machine learning model.

18. The method of inspecting a wafer seal chuck assembly of claim 15, further comprising:

generating an alert for an operator upon identifying the at least one defect associated with the wafer seal chuck assembly.

19. The method of inspecting a wafer seal chuck assembly of claim 15, further comprising:

rinsing the wafer seal chuck assembly after identifying the at least one defect associated with the wafer seal chuck assembly.

* * * * *